United States Patent
Sano et al.

(10) Patent No.: US 7,492,792 B2
(45) Date of Patent: Feb. 17, 2009

(54) APPARATUS FOR RECEIVING DIGITAL DATA

(75) Inventors: Seiichi Sano, Tokyo (JP); Atsushi Miyashita, Tokyo (JP)

(73) Assignee: Hitachi Kokusai Electric Inc., Higashi-Nakano, Nakano-Ku, Tokyo (JP)

( * ) Notice: Subject to any disclaimer, the term of this patent is extended or adjusted under 35 U.S.C. 154(b) by 521 days.

(21) Appl. No.: 11/071,179

(22) Filed: Mar. 4, 2005

(65) Prior Publication Data
US 2005/0195846 A1    Sep. 8, 2005

(30) Foreign Application Priority Data
Mar. 4, 2004   (JP) .............................. 2004-060338

(51) Int. Cl.
*H04J 3/06*   (2006.01)
(52) U.S. Cl. .................... 370/503; 370/509; 370/512
(58) Field of Classification Search ................ 370/503, 370/509, 512, 412–414, 395.62
See application file for complete search history.

(56) References Cited

U.S. PATENT DOCUMENTS 5,914,962 A * 6/1999 Fimoff et al. ............... 370/538
6,081,650 A * 6/2000 Lyons et al. ................ 386/95
6,480,551 B1 * 11/2002 Ohishi et al. ............... 375/260
6,674,805 B1 * 1/2004 Kovacevic et al. ...... 375/240.28
7,251,303 B2 * 7/2007 Sano ......................... 375/351

FOREIGN PATENT DOCUMENTS

| JP | 2000-232435 | 8/2000 |
|----|-------------|--------|
| JP | 2000-269864 | 9/2000 |
| JP | 2000-341335 | 12/2000 |
| JP | 2001-145022 | 5/2001 |
| JP | 2002-281004 | 9/2002 |

* cited by examiner

*Primary Examiner*—Chirag G Shah
*Assistant Examiner*—Otis L Thompson, Jr.
(74) *Attorney, Agent, or Firm*—Bacon & Thomas, PLLC

(57) ABSTRACT

An apparatus for receiving digital data includes a memory unit for temporarily storing therein a plurality of data streams, each of which includes data and clock obtained by demodulating plural redundant signals received in each receiver in response to a signal generated based on each clock; a writing control unit for controlling a writing of the plurality of the data streams into the memory unit; a data reading control unit for reading the data streams stored temporarily in the memory unit in a synchronized manner; and a selection unit for selecting one of the read data streams to output the selected data stream. The writing control unit detects a synchronization packet included in the plurality of data streams to control the writing of the plurality of data streams into the memory unit based on the synchronization packet.

2 Claims, 7 Drawing Sheets

APPARATUS FOR RECEIVING DIGITAL DATA

FIELD OF THE INVENTION

The present invention relates to an STL (studio transmitter link) receiving apparatus for receiving digital broadcasting signals transmitted from a broadcasting station or studio to a transmitting station; and, more particularly, a digital data switching technology for receiving plural redundant digital broadcasting signals received through plural paths to select one of the plural digital broadcasting signals.

BACKGROUND OF THE INVENTION

As for an STL receiving apparatus for receiving digital broadcasting signals transmitted from a broadcasting station or studio to a transmitting station, there is known a digital data receiving apparatus for receiving plural redundant broadcasting signals through plural receivers which includes a switching unit for selecting one of the plural digital broadcasting signals.

FIG. 4 shows a block diagram illustrating an apparatus for receiving digital data disclosed in the patent application filed by the inventors prior to this patent application. Referring to FIG. 4, an STL receiving apparatus 100 selects TS (transport stream) data and a TS clock based on digital broadcasting signals received through an antenna 10 to send the selected TS data and TS clock to a first and a second broadcaster 50A and 50B. Further, the STL receiving apparatus 100 includes a first receiver 20A and a second receiver 20B, a switching control device 40 and a switching unit 300.

In the STL receiving apparatus 100, the digital broadcasting signals received through the antenna 10 are inputted to the first receiver 20A and the second receiver 20B. The inputted digital broadcasting signals are transformed into IF (intermediate frequency) signals by down converters 21A and 21B and then demodulated by demodulators 22A and 22B, which are installed in the receivers 20A and 20B, respectively. Dividers 23A and 23B divide the demodulated digital data obtained by the demodulators 22A and 22B into TS (transport stream) data and TS clocks.

A first TS clock 30-1 and a first TS data 30-2 outputted from the first receiver 20A are inputted to a first synchronizing controller 33A, which detects a synchronous code included in the first TS data 30-2. A first write reset signal CTL for a first memory 34A is generated based on the synchronous code. The first TS data 30-2 is written into the first memory 34A in response to the first TS clock 30-1 and the first write reset signal CTL generated by the first synchronizing controller 33A.

Likewise, a second TS data 30-4 is written into a second memory 34B in response to a second TS clock 30-3 and a second write reset signal CTL generated by the second synchronizing controller 33B based on the second TS data 30-4.

A clock control device 35 receives the first and the second TS clock 30-1 and 30-3 and outputs a post-switching clock 30-5 pursuant to a switching control signal 30-7 outputted by a switching control device 40. A data control device 37 receives the post-switching clock 30-5 from the clock control device 35 as well as, for example, the first TS data 30-2 from the first synchronizing controller 33A and the second TS data 30-4 from the second synchronizing controller 33B to output a read reset signal 30-19 to the memories 34A and 34B. The read reset signal 30-19 is outputted from the data control device 37, for example, after a time period MAXW from a rising edge of the first write reset signal CTL and a time period MINX from a rising edge of the second write reset signal CTL, as shown in FIG. 5. The data control device 37 also outputs a selection signal to a selector 31. The selector 31 selects one of the two TS read datas (TS read data 30-17 and TS read data 30-18) in response to the selection signal outputted from the data control device 37 and outputs a post-switching data 30-6. If, for example, the first TS read data 30-17 is corrupted but the second TS read data 30-18 is not, the second TS read data is selected and outputted as the post-switching data 30-6.

The post-switching clock 30-5 is inputted to the first and the second memory 34A and 34B and used for reading data from the memories. The post-switching clock 30-5 is also inputted to the data control device 37 for generating the read reset signal 30-19 to the first memory 34A and the second memory 34B.

As a result, the first memory 34A and the second memory 34B are controlled by the same clock, i.e., the post-switching clock 30-5, and the same control signal, i.e., the read reset signal 30-19, when reading the memories 34A and 34B. Therefore, the first TS read data 30-17 outputted from the memory 34A and the second TS read data 30-18 outputted from the memory 34B are synchronous.

Hereinafter, waveforms of the signals generated in the apparatus 100 will be described with reference to FIG. 5. As shown in FIG. 5, the first TS read data 30-17 and the second TS read data 30-18 are read out at the same time because the memories 34A and 34B are read in response to the same read reset signal. Therefore, the first and the second data can be seamlessly switched into the post-switching data 30-6 by the selector 31, as illustrated in FIG. 5. In the case shown in FIG. 5, for example, signals 1-(0), 1-(1), 2-(2), 2-(3) and 1-(4) are outputted sequentially.

As described above, by using the apparatus for receiving digital data shown in FIG. 4, a plurality of data streams (data, clocks) obtained by demodulating plural redundant signals received in plural receivers can be switched so that a certain data stream can be switched into another data stream without causing an interruption of clocks or data.

However, the apparatus of FIG. 4 has such a drawback as explained hereinafter. Referring to FIG. 4, the first TS clock 30-1 and the first TS data 30-2 outputted from the first receiver 20A are inputted to the first synchronizing controller 33A. The synchronizing controller 33A detects a synchronization byte (47h) included in the first TS data 30-2 to generate the first write reset signal CTL for the first memory 34A. Using a synchronization byte (47h) in each TS data packet, a time delay between the first and the second data should not be greater than 1 TS (204 W) in order to properly handle the time delay, wherein 1 TS is 50 μs at a bit rate of 32.508 Mbps.

FIG. 4 illustrates a case where the signals received by the antenna 10 are distributed through plural paths, a plurality of data streams are obtained by demodulating the received signals and a data stream selected from the plurality of data streams is outputted. In this case, a time delay between the receivers 20A and 20B is so small (1 to 10 μs) that it is possible to avoid problems due to the time delay.

However, e.g., in case where the receiver 20A serves as a microwave transmission path and the receiver 20B serves as an optical transmission path, a time delay greater than 1 TS may occur since each signal is received through a different path.

In other words, when transmitting signals from a broadcasting studio or station to a repeater station, i.e., an STL receiving apparatus, signals sent through the microwave transmission path are transmitted directly to the receiver 20A whereas signals sent through the optical transmission path goes through a longer path because an optical fiber constituting the optical transmission path is installed underground. As a result, a time delay between the corresponding transmission paths becomes greater than 1 TS, making it difficult to perform a seamless data switching.

SUMMARY OF THE INVENTION

It is, therefore, an object of the present invention to provide an apparatus for receiving digital data that can perform a seamless switching even when there occurs a time delay greater than or equal to 1 TS among a plurality of data streams obtained by demodulating plural redundant signals received in plural receivers.

In accordance with the present invention, there is provided an apparatus for receiving digital data, including: a memory unit for temporarily storing therein a plurality of data streams, each of which includes data and clock information, obtained by demodulating plural redundant signals received in each receiver in response to a signal generated based on the each clock; a writing control unit for controlling a writing of the plurality of the data streams into the memory unit; a data reading control unit for reading the data streams stored temporarily in the memory unit in a synchronized manner; and a selection unit for selecting one of the read data streams to output the selected data stream, wherein the writing control unit detects a synchronization packet included in the plurality of data streams to control the writing of the plurality of data streams into the memory unit based on the synchronization packet, wherein the synchronization packet is included in the data streams at a rate of a single packet per frame.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

Figure 1:
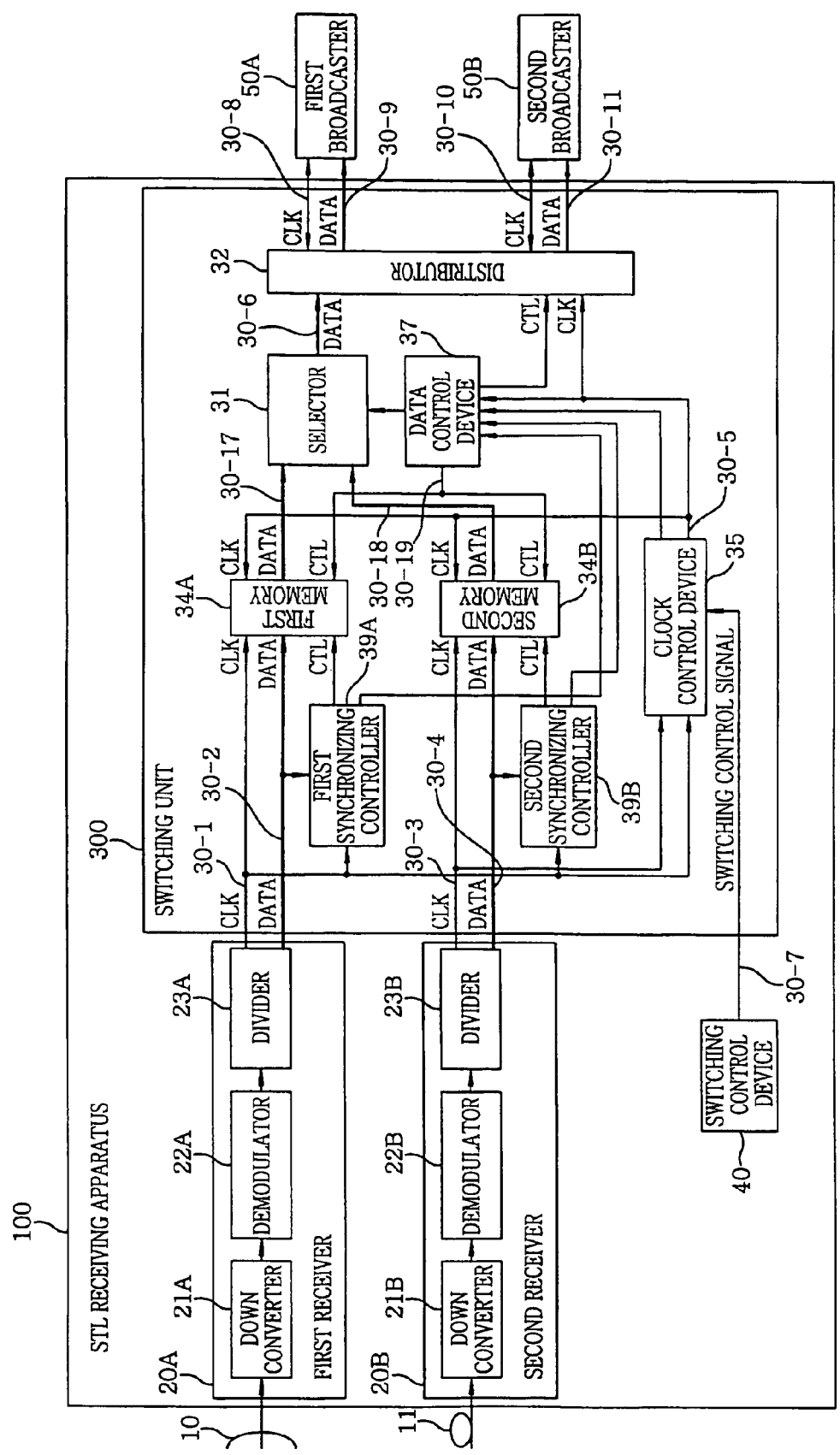
FIG. 1 shows a block diagram illustrating an apparatus for receiving digital data in accordance with a preferred embodiment of the present invention.
Figure 4:
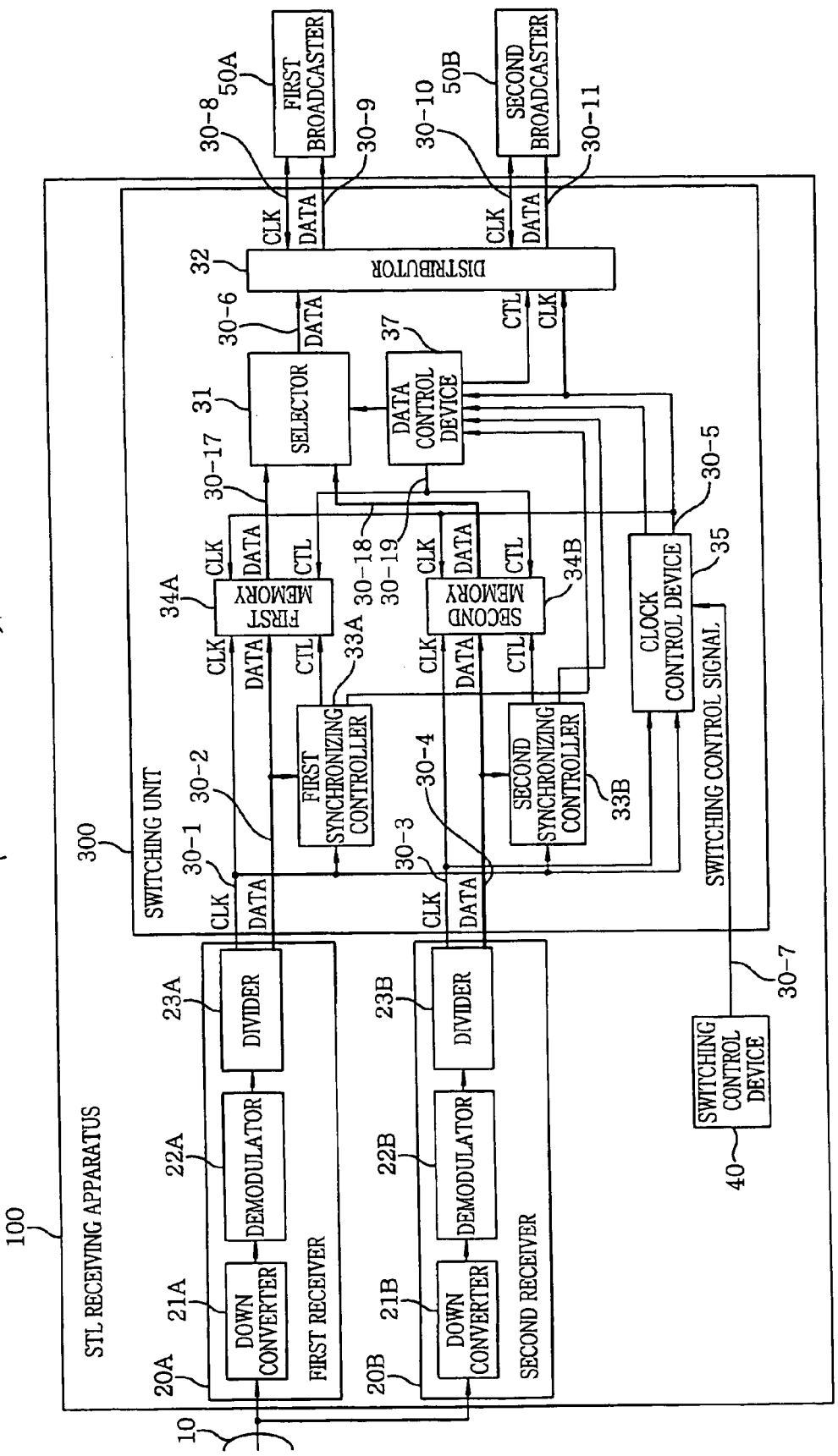
FIG. 4 describes a block diagram illustrating an apparatus for receiving digital data disclosed in the patent application previously filed by the applicant.
Figure 5:
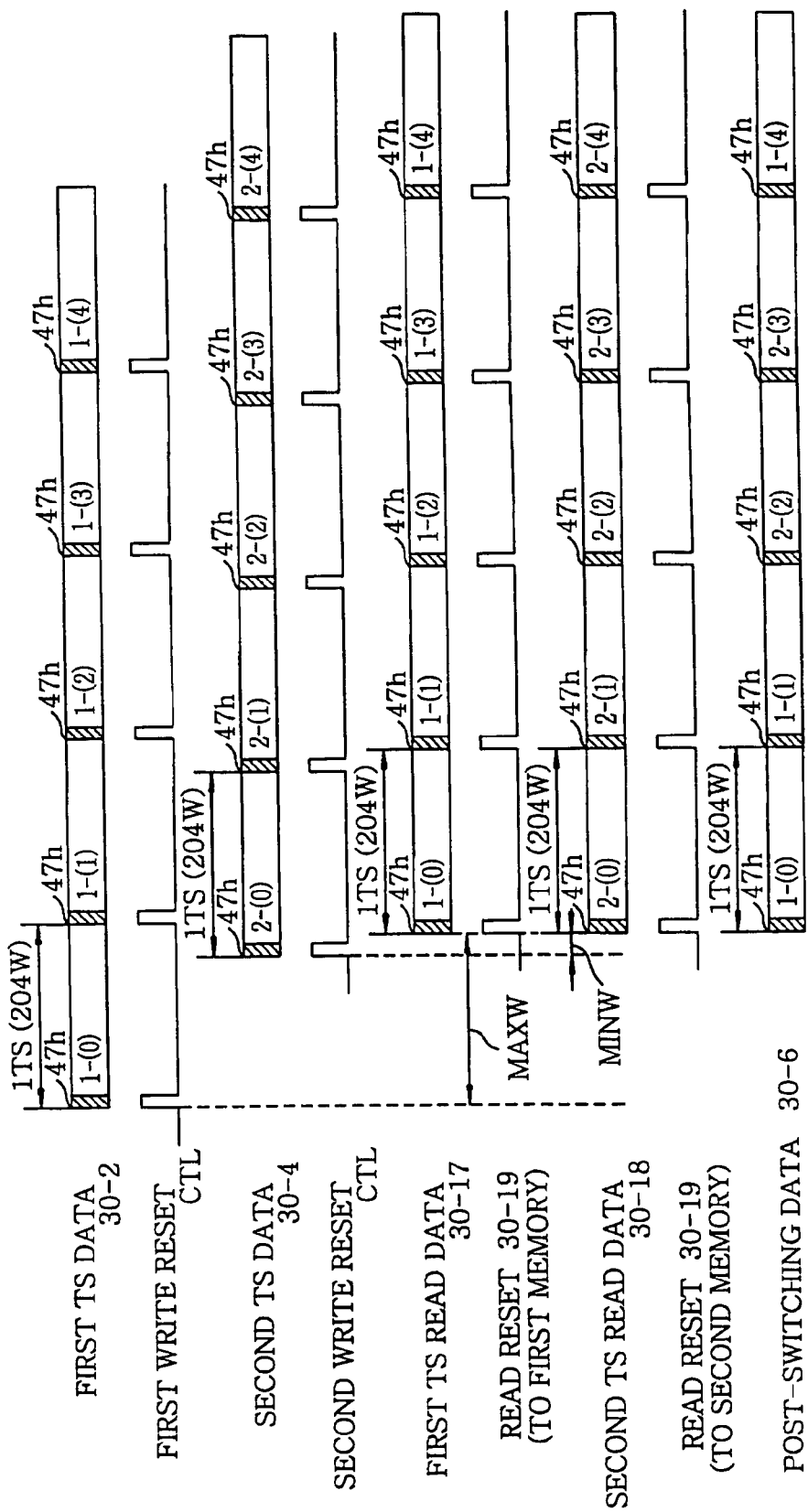
FIG. 5 presents a timing chart showing waveforms of signals for explaining an operation of the section shown in FIG. 4.

FIG. 1 shows a block diagram illustrating an apparatus for receiving digital data in accordance with a preferred embodiment of the present invention. In the apparatus for receiving digital data shown in FIG. 1, digital broadcasting signals received through an antenna 10 are demodulated by a receiver 20A, and those received through an optical transmission path 11 are demodulated by a receiver 20B. The apparatus of FIG. 1 has the same configuration as that shown in FIG. 4, except that synchronizing controllers 39A and 39B are provided in place of the synchronizing controllers 33A and 33B. The synchronizing controllers 39A and 39B detect IIP packets included in data streams and perform controls (write resets) on memories 34A and 34B to write a plurality of data streams into the memories 34A and 34B based on the detected IIP packets, whereas the synchronizing controllers 33A and 33B detect a synchronous byte (47h) included in TS data and perform controls (write resets) on the memories 34A and 34B.

Figure 2:
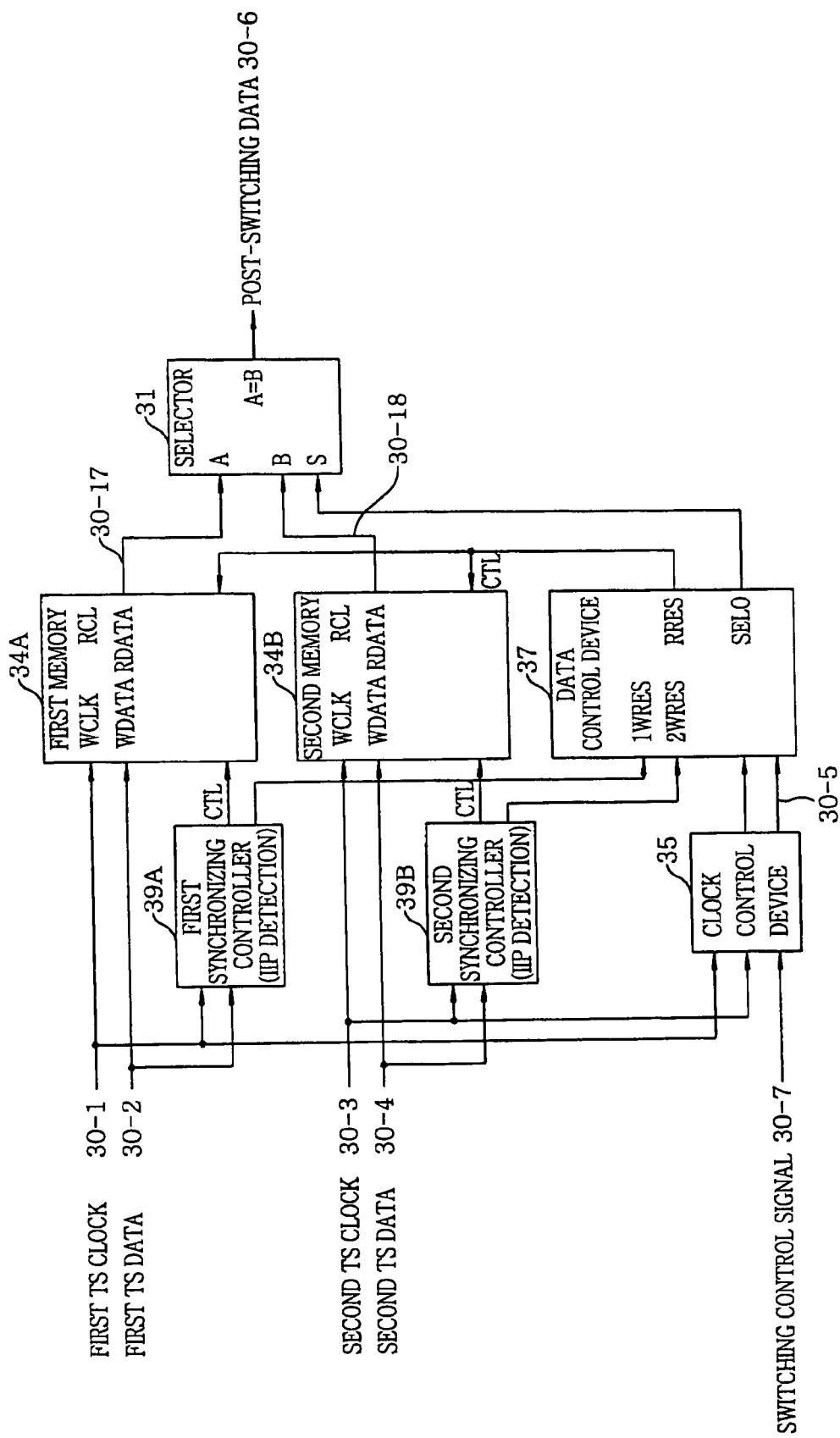
FIG. 2 illustrates an enlarged view of a section including a synchronizing controller shown in FIG. 1 in accordance with the present invention.

Hereinafter, the synchronizing controllers 39A and 39B will be explained in detail with reference to FIG. 2. FIG. 2 illustrates an enlarged view of a section including a synchronizing controllers 39A and 39B shown in FIG. 1 in accordance with the present invention.

Referring to FIG. 2, a first TS clock 30-1 and a first TS data 30-2 are inputted to the first synchronizing controller 39A, which detects an IIP packet included in the first TS data 30-2. A first control (write reset) signal CTL for a first memory 34A is generated based on the detected IIP packet. The first TS data 30-2 is written into the first memory 34A in response to the first TS clock 30-1 and the first control (write reset) signal CTL generated by the first synchronizing controller 39A.

Likewise, a second TS data 30-4 is written into the second memory 34B in response to a second TS clock 30-3 and a second control signal CTL generated by the second synchronizing controller 39B based on the second TS data 30-4.

Figure 3:
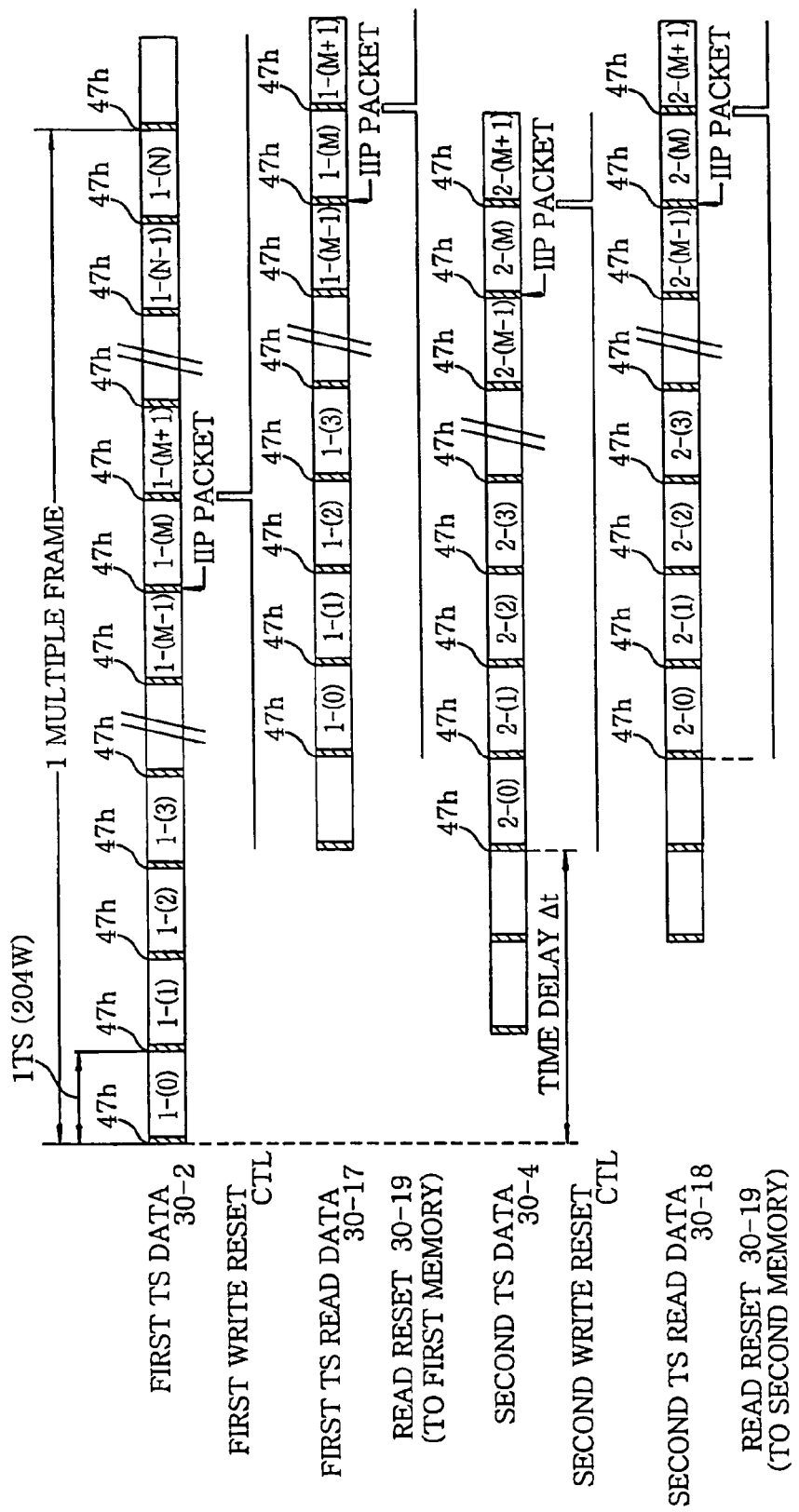
FIG. 3 depicts a timing chart showing waveforms of signals for explaining an operation of the section shown in FIG. 2.

A clock control device 35 receives the first TS clock 30-1 and the second TS clock 30-2 and outputs a post-switching clock 30-5 pursuant to a switching control signal 30-7 outputted by a switching control device 40. A data control device 37 receives the post-switching clock 30-5 from the clock control device 35 as well as, for example, the first TS data 30-2 from the first synchronizing controller 39A and the second TS data 30-4 from the second synchronizing controller 39B to output a read reset signal 30-19 to the memories 34A and 34B. The read reset signal 30-19 is outputted from the data control device 37, for example, after a time period corresponding to 1 TS from the end of a TS packet including the most lately detected IIP packet, i.e., the TS packet of 2-(M) in the second TS data 30-4 as shown in FIG. 3, on condition that the IIP packets are detected from both of the TS data 30-2 and 30-4. The data control device 37 also outputs a selection signal to a selector 31. The selector 31 selects one of the two TS read datas (the TS read data 30-17 and the TS read data 30-18) in response to the selection signal from the data control device 37 and outputs a post-switching data 30-6. If, for example, the first TS read data 30-17 is corrupted but the second TS read data 30-18 is not, the second TS read data is selected and outputted as the post-switching data 30-6.

Hereinafter, waveforms of the signals will be described with reference to FIG. 3. As shown in FIG. 3, the first read data 30-17 and the second read data 30-18 are read out at the same time because the memory 34A and 34B are subject to a read operation in response to the same read reset signal.

In accordance with the present embodiment, as can be seen in FIG. 3, a data switching can be performed by minimizing the effect of a time delay Δt between the first TS data 30-2 and the second TS data 30-4 even when the time delay Δt is greater than or equal to 1 TS, because a memory is controlled based on an identical IIP packet throughout multiple frames.

Figure 6:
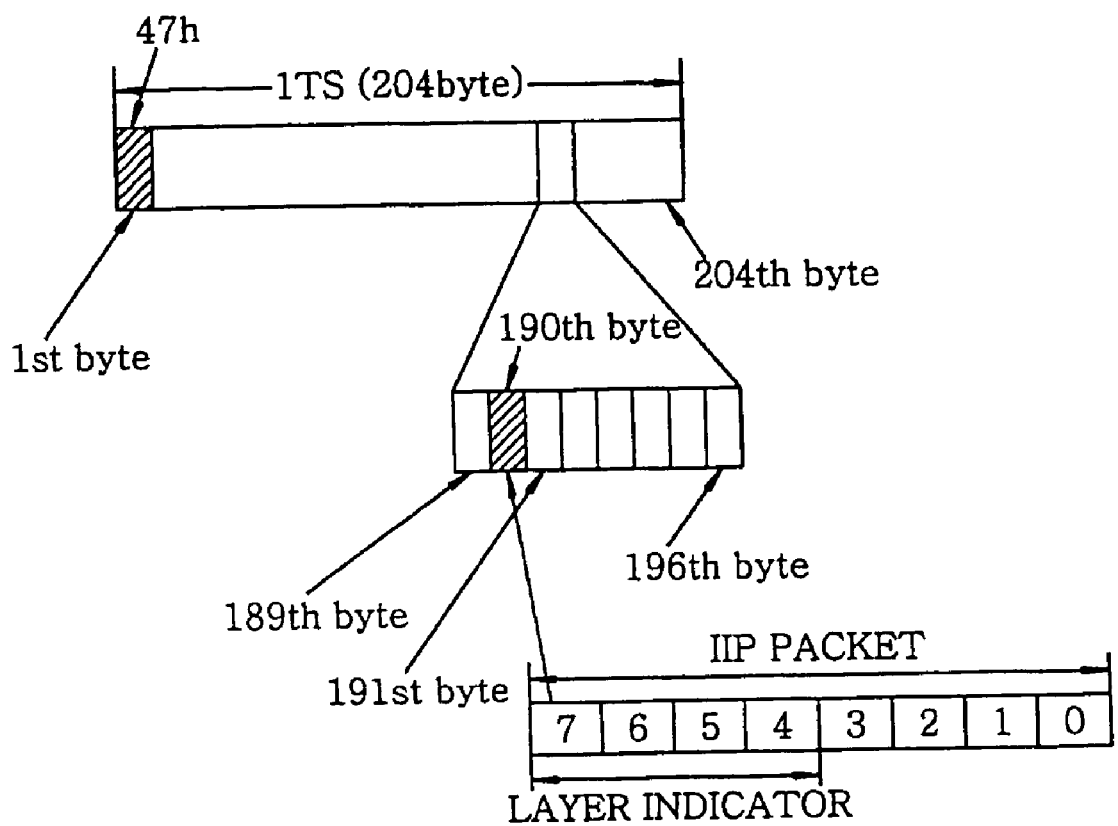
FIG. 6 shows a configuration of a 1 TS packet and an IIP packet included therein.

In the following, there will be given an explanation on a configuration of an IIP packet included in a TS packet and a detection thereof with reference to FIGS. 6 and 7. FIG. 6 shows a configuration of a TS packet of 1 TS (204 bytes). The $1^{ST}$ byte is a synchronization byte and the bytes from $189^{th}$ to 196$^{th}$ provide information on a transmission control. There is provided an area for representing an IIP packet in the 190$^{th}$ byte. Specifically, the bits from the 7$^{th}$ to the 4$^{th}$ of the 190$^{th}$ byte are '1000'. A time delay not greater than 1 frame (about 230 ms) can be properly handled by detecting the IIP packet, because the IIP packet is inserted only once in every single frame (about 230 ms).

Figure 7:
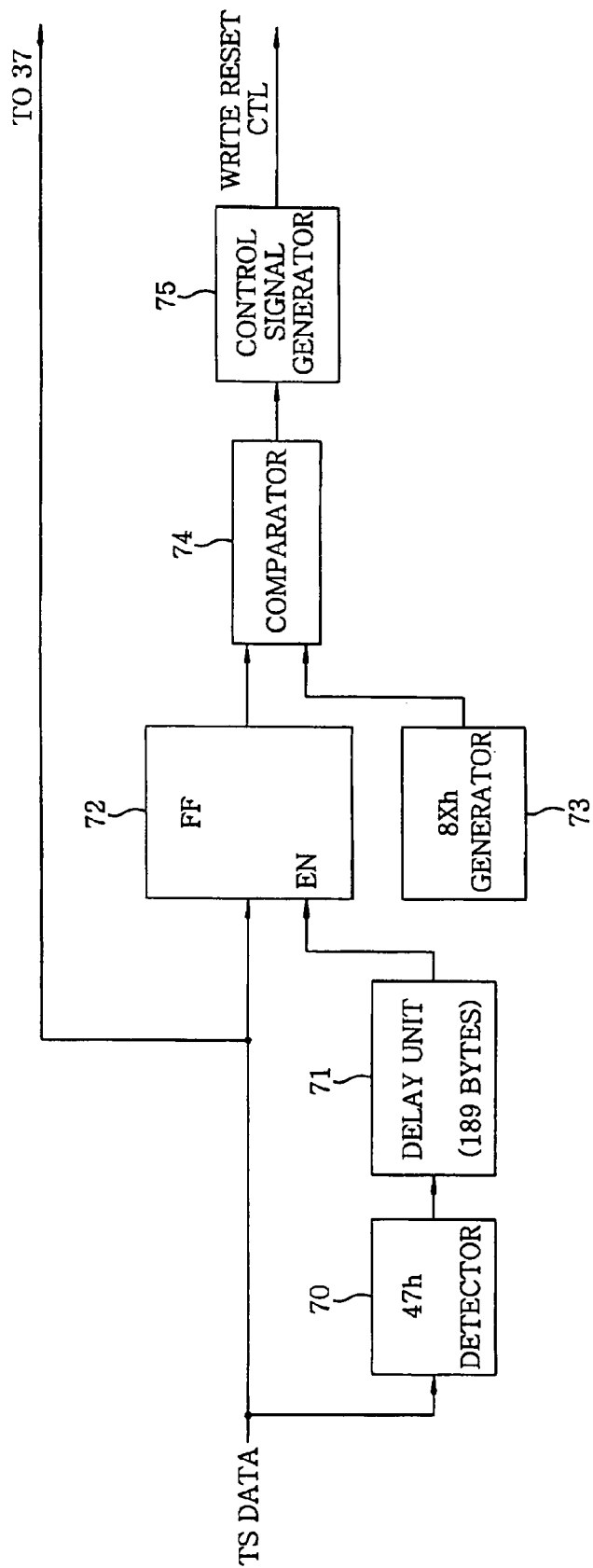
FIG. 7 illustrates a block diagram of a synchronizing controller for detecting an IIP packet shown in FIGS. 1 and 2.

FIG. 7 illustrates a block diagram showing the synchronizing controllers 39A and 39B for detecting an IIP packet shown in FIGS. 1 and 2. A 47$h$ detector 70 receives TS data and detects '47$h$' therefrom to send a detection signal to a delay unit 71. The delay unit 71 holds the detection signal for a time period corresponding to 189 bytes and then outputs the delayed detection signal to an input EN of a FF (flip-flop) 72, so that the 190$^{th}$ byte of the TS packet effectively enters the FF 72. Then, a comparator 74 checks whether an output signal of the FF 72 is '8Xh' by using an output of an 8Xh generator 73, wherein X represents an arbitrary hexadecimal number. That is, the 190$^{th}$ byte is identified as an IIP packet when the output signal of the flip-flop 72 is equal to '8Xh'. In case the comparator 74 detects the IIP packet, a control signal generator 75 generates the first or second write reset signal CTL to be sent to the memories 34A or 34B. The write reset signal CTL is outputted, for example, in synchronization with the beginning of a TS packet immediately following the TS packet including the detected IIP Packet, as shown in FIG. 3. Meanwhile, for example, the first or second TS data 30-2 or 30-4 is sent to the data control device 37 from the synchronizing controller 39A or 39B.

As described above, in accordance with the present embodiment, there is provided an apparatus for receiving digital data that can perform a seamless data switching even when there occurs a time delay greater than or equal to 1 TS among a plurality of data streams (data, clocks) obtained by demodulating plural redundant signals received in plural receivers.

Furthermore, although an IIP packet is used as a synchronizing word in the present embodiment, it is not limited thereto. By employing any single packet per frame, e.g., a frame header flag, there may be implemented an apparatus for receiving digital data that can perform a seamless data switching even when a time delay among a plurality of data streams is greater than or equal to 1 TS.

While the invention has been shown and described with respect to the preferred embodiments, it will be understood by those skilled in the art that various changes and modification may be made without departing from the spirit and scope of the invention as defined in the following claims.

What is claimed is:

1. An apparatus for receiving digital data, comprising:
   a memory unit for temporarily storing therein a plurality of data streams, each of which includes data and clock, obtained by demodulating plural redundant signals received in each receiver in response to a signal generated based on said each clock;
   a writing control unit for controlling a writing of the plurality of said data streams into said memory unit;
   a data reading control unit for reading said streams stored temporarily in said memory unit in a synchronized manner; and
   a selection unit for selecting one of the read data streams to output the selected data stream,
   wherein the writing control unit detects a synchronization packet included in the plurality of data streams to control the writing of the plurality of data streams into the memory unit based on the synchronization packet, the synchronization packet being included in the data streams at a rate of a single packet per frame; and
   wherein the writing control unit includes a comparator configured to check whether a specific byte of the digital data is a specific value;
   a synchronization byte detector for receiving the digital data and detecting a synchronization byte therefrom to output a detection signal; and
   a delay unit for holding the detection signal for a time period corresponding to a specific number of bytes to output the delayed detection signal to the comparator.

2. The apparatus of claim 1, wherein the specific value indicates an IIP ISDB-T (Integrated Services Digital Broadcasting Terrestrial) Information Packet.

* * * * *